United States Patent [19]
Harris et al.

[11] Patent Number: 6,103,364
[45] Date of Patent: Aug. 15, 2000

[54] INK JET PRINTABLE, WASHABLE SATURATED CELLULOSIC SUBSTRATE

[75] Inventors: Linda Garner Harris, Lawrenceville; Francis Joseph Kronzer, Alpharetta; Russell Lynn Dolsey, Roswell, all of Ga.

[73] Assignee: Kimberly-Clark Worldwide, Inc., Neenah, Wis.

[21] Appl. No.: 08/885,558

[22] Filed: Jun. 30, 1997

[51] Int. Cl.$^7$ ...................................................... B32B 5/16
[52] U.S. Cl. ................... 428/326; 428/297.4; 428/298.7; 428/294.7; 428/327; 428/365; 428/401
[58] Field of Search ................................. 428/288, 280, 428/296, 297, 298.7, 303, 326, 327, 332, 401, 903, 299.7, 365, 370; 156/62.2, 767, 220, 306

[56] References Cited

U.S. PATENT DOCUMENTS

| | | | |
|---|---|---|---|
| 3,705,068 | 12/1972 | Dobo et al. | 156/441 |
| 4,064,605 | 12/1977 | Akiyama et al. | 28/103 |
| 4,100,324 | 7/1978 | Anderson et al. | 428/288 |
| 4,118,531 | 10/1978 | Hauser | 428/224 |
| 4,663,220 | 5/1987 | Wisneski et al. | 428/221 |
| 4,931,355 | 6/1990 | Radwanski et al. | 428/283 |
| 5,284,703 | 2/1994 | Everhart et al. | 428/283 |
| 5,780,369 | 7/1998 | Allison et al. | 442/384 |

FOREIGN PATENT DOCUMENTS

| | | |
|---|---|---|
| 0 247 539 | 12/1987 | European Pat. Off. . |
| 0 411 752 A1 | 2/1991 | European Pat. Off. . |
| 0 834 617 A2 | 9/1997 | European Pat. Off. . |
| 3-193980 | 8/1991 | Japan . |

*Primary Examiner*—Merrick Dixon
*Attorney, Agent, or Firm*—Nelson Mullins Riley & Scarborough

[57] ABSTRACT

A saturated hydroentangled fibrous web which includes a fibrous web having a plurality of entanglement loci as a consequence of subjecting the fibrous web to high pressure liquid jets and a saturant which is present in the hydroentangled fibrous web at a level of from about 10 to about 100 percent, based on the dry weight of the fibers. The saturant is adapted to render the saturated paper durable and ink jet printable. The fibrous web is composed of fibers, in which from about 20 to 100 percent by weight, based on the total weight of the fibers, are cellulosic fibers; from 0 to about 70 percent by weight, based on the total weight of the fibers, are mercerized cellulosic fibers; and from about 80 to 0 percent by weight of the fibers, based on the total weight of the fibers, are synthetic polymer fibers. The saturant includes from about 98 to about 70 percent, on a dry weight basis, of a latex reinforcing polymer having a glass transition temperature of from about −40° C. to about 25° C.; and from about 5 to about 70 percent, on a dry weight basis, of a cationic polymer. Either or both of the latex reinforcing polymer and the cationic polymer have crosslinkable functional groups. In addition to the fibrous web, a bonded nonwoven may be present.

15 Claims, No Drawings

INK JET PRINTABLE, WASHABLE SATURATED CELLULOSIC SUBSTRATE

BACKGROUND OF THE INVENTION

The present invention relates to polymer-reinforced or saturated substrates.

The reinforcement of paper by polymer impregnation (commonly referred to as latex saturation) is a long-established practice. The polymer employed typically is a synthetic material, most often a latex, and the paper may consist solely of cellulosic fibers or of a mixture of cellulosic and noncellulosic fibers. Polymer reinforcement is employed to improve one or more of such properties as dimensional stability, resistance to chemical and environmental degradation, resistance to tearing, embossability, resiliency, conformability, moisture and vapor transmission, and abrasion resistance, among others.

Saturated papers typically have been used as label print stock, base substrates for abrasive papers, and similar applications where strength is an essential requirement. They have not, however, been used for the preparation of garment care labels. Current garment care labels typically are woven or nonwoven fabrics printed by flexography, offset printing or hot stamp printing. While these products generally are satisfactory, the ability to use variable print information by computer generation is not possible. Because of cost constraints, color printing of the care and content label currently is not available. For example, the use of ink jet printing cannot be utilized because the water soluble dyes used in ink jet printers also would be soluble during washing of the garment and the printed information would be lost. Nevertheless, ink jet printing technology provides both advantages of variable information printing and color at low cost. Accordingly, there is a need for a low cost garment label material which is ink jet printable.

SUMMARY OF THE INVENTION

The present invention addresses some of the difficulties and problems discussed above by providing a saturated hydroentangled fibrous web which includes fibers and a saturant. The fibers include from about 20 to 100 percent by weight of cellulosic fibers, based on the total weight of the fibers. From 0 to about 70 percent by weight of the fibers may be mercerized cellulosic fibers, again based on the total weight of the fibers. From about 80 to 0 percent by weight of the fibers, based on the total weight of the fibers, may be synthetic polymer fibers. For example, substantially all of the fibers may be cellulosic fibers.

In general, the fibrous web may have a basis weight of from about 30 to about 135 grams per square meter (gsm). In certain embodiments, from about 10 to about 50 percent by weight of the fibers may be mercerized cellulosic fibers. In other embodiments, from about 10 to about 40 percent by weight of the fibers may be synthetic polymer fibers. In still other embodiments, both mercerized cellulosic fibers and synthetic polymer fibers may be present. By way of illustration only, the synthetic polymer fibers may be polyester or polyamide fibers.

The fibrous web may be hydroentangled by any known means before the web is saturated. Hydroentangling results in a plurality of entanglement loci in the fibrous web. For example, the fibrous web may have a number of entanglement loci in a range of from about 62 to about 560 per square cm. As another example, the fibrous web may have a number of entanglement loci in a range of from about 142 to about 390 per square cm.

The saturant is present in the saturated hydroentangled fibrous web at a level of from about 10 to about 100 percent, based on the dry weight of the fibers, and is adapted to render the saturated hydroentangled fibrous web durable and ink jet printable. When synthetic polymer fibers are present in the web, the saturant may be adapted to wet synthetic polymer fibers. For example, the saturant may be present in the saturated hydroentangled fibrous web at a level of from about 20 to about 70 percent. As another example, the saturant may be present at a level of from about 30 to about 60 percent.

The saturant includes from about 98 to about 70 percent, on a dry weight basis, of a latex reinforcing polymer having a glass transition temperature of from about $-40°$ C. to about $25°$ C.; and from about 5 to about 80 percent, on a dry weight basis, of a cationic polymer. Either or both of the latex reinforcing polymer and the cationic polymer should have crosslinkable functional groups. For example, the crosslinkable functional groups may be present in the cationic polymer. Crosslinking may be assisted by the addition of one or more crosslinking agents to the saturant. By way of example, the latex reinforcing polymer may have a glass transition temperature of from about $-20°$ C. to about $15°$ C. As another example, the cationic polymer may be present in the saturant at a level of from about 10 to about 60 percent. As a further example, the cationic polymer may be present at a level of from about 15 to about 50 percent. If desired, the saturant also may include a filler at a level up to about 20 percent, on a dry weight basis. For example, the filler may be titanium dioxide.

In certain embodiments, the saturant may be present in the saturated hydroentangled fibrous web at a level of from about 20 to about 70 percent, based on the dry weight of the fibers; the amount of the latex reinforcing polymer in the saturant may be from about 96 to about 80 percent, on a dry weight basis; the glass transition temperature of the latex reinforcing polymer may be from about $-20°$ C. to about $15°$ C.; and the amount of cationic polymer in the saturant may be from about 10 to about 60 percent, on a dry weight basis. For example, the saturant may be present at a level of from about 30 to about 70 percent. While the latex reinforcing polymer may be either nonionic or cationic, nonionic latex reinforcing polymers are desired. For example, the latex reinforcing polymer may be an ethylene-vinyl acetate copolymer or a nonionic polyacrylate. Examples of cationic latex reinforcing polymers include, by way of illustration only, polyamides, amide-epichlorohydrin resins, polyethyleneimines, polyacrylamides, and urea-formaldehyde resins.

By way of example, substantially all of the fibers comprising the fibrous web may be cellulosic fibers. As a further example, the saturant may be adapted to wet synthetic polymer fibers. As still another example, the fibrous web may have a basis weight of from about 30 to about 135 gsm. As a still further example, the hydroentangled fibrous web may have a number of entanglement loci in a range of from about 62 to about 560 per square cm. As yet another example, the hydroentangled fibrous web may have a number of entanglement loci in a range of from about 142 to about 390 per square cm.

The present invention further provides a hydroentangled fibrous substrate which includes a first layer composed of fibers and having first and second surfaces and a second layer which is a bonded nonwoven web having first and second surfaces. The second surface of the first layer overlays the first surface of the second layer. From about 20 to 100 percent by weight of the fibers of the first layer, based on the total weight of the fibers, are cellulosic fibers, and from 0 to about 70 percent by weight of the fibers of the first layer, again based on the total weight of the fibers, may be mercerized cellulosic fibers. From about 80 to 0 percent by weight of the fibers of the first layer, based on the total weight of the fibers, may be synthetic polymer fibers.

The first layer of the hydroentangled fibrous substrate typically may have a basis weight of from about 20 gsm to about 100 gsm. In certain embodiments, from about 10 to about 50 percent by weight of the fibers in the first layer may be mercerized cellulosic fibers. In other embodiments, from about 10 to about 40 percent by weight of the fibers in the first layer may be synthetic polymer fibers. In still other embodiments, both mercerized cellulose fibers and synthetic polymer fibers may be present. By way of illustration only, the synthetic polymer fibers may be polyester or polyamide fibers.

The second layer of the hydroentangled fibrous substrate typically may have a basis weight of from about 6 gsm to about 40 gsm. Such layer is a bonded nonwoven web.

The fibrous substrate may be hydroentangled by any known means before the substrate is saturated to introduce a plurality of entanglement loci in the web. For example, the fibrous web may have a number of entanglement loci in a range of from about 62 to about 560 per square cm. As another example, the fibrous web may have a number of entanglement loci in a range of from about 142 to about 390 per square cm. The first layer may be hydroentangled into the second layer, or the second layer may be hydroentangled into the first layer. Alternatively, both layers may be hydroentangled into each other. Desirably, the first layer will be hydroentangled into the second layer.

A saturant is present in at least the first layer of the substrate at a level of from about 10 to about 100 percent, based on the dry weight of the fibers of the layer or layers in which the saturant is present. Thus, the saturant may be present in only the first layer or, desirably, in both the first layer and the second layer. When synthetic polymer fibers are present in either or both layers, the saturant may be adapted to wet synthetic polymer fibers. When saturant is present in both layers, the hydroentangled fibrous substrate properly may be referred to as a saturated hydroentangled fibrous substrate.

DETAILED DESCRIPTION OF THE INVENTION

As used herein, the term "hydroentangled" (or "hydraulically entangled" or any variation thereof) with reference to a fibrous web or substrate means the web or substrate has been subjected to a hydraulic entangling or similar procedure whereby streams or jets of a fluid are employed to entangle the fibers in the fibrous web or substrate. Such jets of fluid orient and entangle fibers in the Z direction, i.e., through the thickness of the web or substrate. Where a jet impinges the web or substrate, a distinct hole or depression is formed which represents a locus of fiber entanglement. For convenience, these jet impingement sites are referred to collectively hereinafter as "entanglement loci." For example, hydraulic entangling may be accomplished by means of conventional hydraulic entangling equipment, such as that described in U.S. Pat. No. 3,485,706 to Evans, which is incorporated herein by reference. Another hydroentangling process which may be employed is described in U.S. Pat. No. 4,144,370 to Bouolton which also is incorporated herein by reference. See also U.S. Pat. Nos. 4,931,355 and 4,879,170 to Radwanski et al., and U.S. Pat. Nos. 4,808,467 to Suskind et al., 4,612,226 to Kennette et.al., and 5,284,703 to Everhart et al., each of which is incorporated herein by reference.

The term "bonded nonwoven web" is used herein to mean any nonwoven web composed of continuous or discontinuous fibers laid down on a foraminous surface in a random manner to form a web, in which a plurality of such fibers have been bonded to one another, either concurrently with or subsequent to web formation. For example, the bonded nonwoven web may be a web prepared by a melt-extrusion process in which melt-extrusion of a thermoplastic polymer to form fibers is followed concurrently by web formation on a foraminous support. Such processes include, among others, meltblowing, coforming, and spunbonding. By way of illustration only, such processes are exemplified by the following references, each of which is incorporated herein by reference:

(a) meltblowing references include, by way of example, U.S. Pat. Nos. 3,016,599 to R. W. Perry, Jr., 3,704,198 to J. S. Prentice, 3,755,527 to J. P. Keller et al., 3,849,241 to R. R. Butin et al., 3,978,185 to R. R. Butin et al., and 4,663,220 to T. J. Wisneski et al. See, also, V. A. Wente, "Superfine Thermoplastic Fibers", *Industrial and Engineering Chemistry*, Vol. 48, No. 8, pp. 1342–1346 (1956); V. A. Wente et al., "Manufacture of Superfine Organic Fibers", Navy Research Laboratory, Washington, D.C., NRL Report 4364 (111437), dated May 25, 1954, United States Department of Commerce, Office of Technical Services; and Robert R. Butin and Dwight T. Lohkamp, "Melt Blowing—A One-Step Web Process for New Nonwoven Products", *Journal of the Technical Association of the Pulp and Paper Industry*, Vol. 56, No.4, pp. 74–77 (1973);

(b) coforming references include U.S. Pat. Nos. 4,100,324 to R. A. Anderson et al. and 4,118,531 to E. R. Hauser; and (c) spunbonding references include, among others, U.S. Pat. Nos. 3,341,394 to Kinney, 3,655,862 to Dorschner et al., 3,692,618 to Dorschner et al., 3,705,068 to Dobo et al., 3,802,817 to Matsuki et al., 3,853,651 to Porte, 4,064,605 to Akiyama et al., 4,091,140 to Harmon, 4,100,319 to Schwartz, 4,340,563 to Appel and Morman, 4,405,297 to Appel and Morman, 4,434,204 to Hartman et al., 4,627,811 to Greiser and Wagner, and 4,644,045 to Fowells.

Nonwoven webs prepared by such processes typically are bonded subsequent to web formation by, for example, pattern bonding. As used herein, the term "pattern bonding" refers to a process of bonding a nonwoven web in a pattern by the application of heat and pressure. Pattern bonding typically is carried out at a temperature in a range of from about 80° C. to about 180° C. and a pressure in a range of from about 150 to about 1,000 pounds per linear inch (about 59–178 kg/cm). The pattern employed typically will have from about 10 to about 250 bonds/inch$^2$ (about 1–40 bonds/cm$^2$) covering from about 5 to about 30 percent of the web surface area. Such pattern bonding is accomplished in accordance with known procedures. See, for example, U.S. Design Pat. No. 239,566 to Vogt, U.S. Design Pat. No. 264,512 to Rogers, U.S. Pat. No. 3,855,046 to Hansen et al., and U.S. Pat. No. 4,493,868, supra, for illustrations of bonding patterns and a discussion of bonding procedures, which patents are incorporated herein by reference.

The term "bonded nonwoven web" also includes a bonded carded web; the web may be pattern bonded or, if it includes bonding fibers, through air bonded. The term "carded web" is used herein to mean a nonwoven web prepared from staple fibers which are usually purchased in bales. The bales are placed in a picker which separates the fibers. Next, the fibers are sent through a combing or carding unit which further breaks apart and aligns the staple fibers in the machine direction so as to form a machine direction-oriented fibrous nonwoven web. Once the web has been formed, it is then bonded by one or more of several bonding methods.

The term "bonding fibers" has reference to bicomponent thermoplastic polymer fibers in which the first component has a melting point which is at least about 50° C. lower than the melting point of the second component. As used herein, the term "bicomponent thermoplastic polymer fibers" refers to fibers which have been formed from at least two thermoplastic polymers extruded from separate extruders but spun together to form one fiber. The polymers are arranged in substantially constantly positioned distinct zones across the cross-section of the bicomponent fibers and extend continuously along the length of the bicomponent fibers. The configuration of such a bicomponent fiber may be, for example, a sheath-core arrangement wherein one polymer is surrounded by another, lower melting polymer, or a side-by-side arrangement. Bicomponent fibers are taught in U.S. Pat. No. 5,108,820 to Kaneko et al., U.S. Pat. No. 5,336,552 to Strack et al., and European Pat. No. 0 586 924. The component polymers may be present in any desired ratio.

The term "melting point" and variations thereof are used herein only in a qualitative sense and are not meant to refer to any particular test procedure. Reference herein to a melting point (temperature) or range is meant only to indicate an approximate temperature or range at which a polymer melts to an extent sufficient to form interfiber bonds.

The term "interfiber bonds" is used herein to mean the bonding of one fiber to another, adjacent fiber, typically at or near juncture points where one fiber meets or crosses another fiber. Bonding generally results from the film-forming characteristics of an adhesive or binder or from the melting of an adhesive or binder or a portion of either or both of the adjacent fibers.

The term "through air bonding" is used herein to mean a process of bonding a nonwoven bicomponent fiber web. The process involves winding the web at least partially around a screen-covered drum which is enclosed in a hood. Air which is sufficiently hot to melt one of the polymers of which the fibers of the web are made (e.g., the sheath polymer of the bicomponent thermoplastic polymer fibers) is forced from the hood, through the web and into the perforated roller. The air velocity may be, by way of example, between 100 and 500 feet per minute and the dwell time may be as long as 6 seconds. The melting and resolidification of the polymer provide the bonding.

The term "through air bonding" also includes the use of a hot air knife as described in commonly assigned U.S. Pat. Application No. 08/362,328, filed on Dec. 22, 1994, which is incorporated herein by reference. Briefly, a hot air knife is a device which focuses a stream of heated air at a high linear flow rate onto a carded nonwoven web. For example, the linear flow rate of the stream of heated air may be in a range of from about 300 to about 3,000 meters per minute and the temperature of the stream may be in a range of from about 90° C. to about 290° C. Higher temperatures may be used, depending upon the melting point of the polymer employed as the first or sheath component in the bicomponent thermoplastic polymer fibers present in the web. The stream of heated air is arranged and directed by at least one slot which typically has a width of from about 3 to about 25 mm and is oriented in a substantially cross-machine direction over substantially the entire width of the web. A plurality of slots may be employed, if desired, and they may be arranged next to or separate from each other. The at least one slot may be continuous or discontinuous and may be composed of closely spaced holes. The hot air knife has a plenum to distribute and contain the heated air prior to exiting the slot. The plenum pressure of the air usually is from about 2 to about 22 mm Hg. The hot air knife typically is positioned from about 6 to about 254 mm above the surface of the carded web.

The term "synthetic polymer fibers" is used herein to mean fibers prepared from any synthetic polymer known to those having ordinary skill in the art, such as thermoplastic polymers and thermosetting polymers.

The term "thermoplastic polymer" is used herein to mean a polymer that softens when exposed to heat and returns to its original condition when cooled to room temperature. Examples of thermoplastic polymers include, by way of illustration only, end-capped polyacetals, such as poly (oxymethylene) or polyformaldehyde, poly (trichloroacetaldehyde), poly(n-valeraldehyde), poly (acetaldehyde), and poly-(propionaldehyde); acrylic polymers, such as polyacrylamide, poly(acrylic acid), poly (methacrylic acid), poly(ethyl acrylate), and poly(methyl methacrylate); fluoro-carbon polymers, such as poly (tetrafluoroethylene), perfluorinated ethylene-propylene copolymers, ethylene-tetrafluoroethylene copolymers, poly (chlorotrifluoroethylene), ethylene-chlorotrifluoroethylene copolymers, poly(vinylidene fluoride), and poly(vinyl fluoride); polyamides, such as poly(6-aminocaproic acid) or poly($\epsilon$-caprolactam), poly-(hexamethylene adipamide), poly (hexamethylene sebacamide), and poly(11-amino-undecanoic acid); polyaramides, such as poly(imino-1,3-phenyleneiminoisophthaloyl) or poly(m-phenylene isophthalamide); parylenes, such as poly-p-xylylene and poly(chloro-p-xylylene); polyaryl ethers, such as poly(oxy-2,6-dimethyl-1,4-phenylene) or poly(p-phenylene oxide); polyaryl sulfones, such as poly(oxy-1,4-phenylenesul-fonyl-1,4-phenyleneoxy-1,4-phenylene-isopropylidene-1,4-phenylene) and poly(sul-fonyl-1,4-phenylene-oxy-1,4-phenylenesulfonyl-4,4'-biphenylene); polycarbonates, such as poly(bisphenol A) or poly(carbonyldioxy-1,4-phenyleneisopropylidene-1,4-phenylene); polyesters, such as poly(ethylene terephthalate), poly(tetramethylene terephthalate), and poly(cyclohexylene-1,4-dimethylene terephthalate) or poly(oxy-methylene-1,4-cyclohexylene-methyleneoxyterephthaloyl); polyaryl sulfides, such as poly (p-phenylene sulfide) or poly(thio-1,4-phenylene); polyimides, such as poly-(pyromellitimido-1,4-phenylene); polyolefins, such as polyethylene, polypropylene, poly(1-butene), poly(2-butene), poly(1-pentene), poly(2-pentene), poly(3-methyl-1-pentene), and poly(4-methyl-1-pentene); vinyl polymers, such as poly(vinyl acetate), poly(vinylidene chloride), and poly(vinyl chloride); diene polymers, such as 1,2-poly-1,3-butadiene, 1,4-poly-1,3-butadiene, polyisoprene, and polychloroprene; poly-styrenes; copolymers of the foregoing, such as acrylonitrile-butadiene-styrene (ABS) copolymers; and the like.

Examples of thermosetting polymers include, by way of illustration only, alkyd resins, such as phthalic anhydride-glycerol resins, maleic acid-glycerol resins, adipic acid-glycerol resins, and phthalic anhydride-pentaerythritol resins; allylic resins, in which such monomers as diallyl phthalate, diallyl isophthalate diallyl maleate, and diallyl chlorendate serve as nonvolatile cross-linking agents in polyester compounds; amino resins, such as aniline-formaldehyde resins, ethylene urea-formaldehyde resins, dicyandiamide-formaldehyde resins, melamine-formaldehyde resins, sulfonamide-formaldehyde resins, and urea-formaldehyde resins; epoxy resins, such as cross-linked epichlorohydrin-bisphenol A resins; phenolic resins, such as phenol-formaldehyde resins, including Novolacs and resols; and thermosetting polyesters, silicones, and urethanes.

As used herein, the term "saturant" is synonymous with the term "binder" and refers to a polymeric composition as defined herein which may be used to bind the fibers of the web or substrate together. The saturant may be applied as either a solution of a polymer in a suitable solvent or as a dispersion of very small polymer particles in a liquid phase, such as water, i.e., as a latex.

The term "crosslinkable functional groups" is meant to include functional groups which are capable of reacting with groups of the same or a different type to form covalent bonds. Such functional groups are well known to those having ordinary skill in the art. Examples of such groups include, by way of illustration only, carboxy, hydroxy, amino groups, and hydroxymethyl groups.

Broadly stated, the present invention relates to a hydroentangled substrate which is latex impregnated to produce an absorbent matrix with a high level of internal strength and flexibility for use in washable label applications. The hydroentangled substrate may consist of various levels of cellulose fiber, synthetic fiber and nonwoven fiber matrixes. The unique properties developed by the present invention provide exceptional strength and durability while maintaining drapeability and absorbence to printing inks or coatings.

The latex saturation of a hydroentangled substrate results in exceptional internal strength. The absorbent characteristic of the hydroentangled substrate results in a high level of latex add on of dry grams of latex per dry grams of fiber.

In the normal wet laid process of paper formation on a fourdrinier paper machine, all fibers in the web are laid in the plane of the web as it proceeds through the paper machine. In a hydroentangled web, the Z orientation of a portion of the fibers results in increased internal bond of the hydroentangled web. The Z orientation of fibers during the hydroentangling process also results in minute holes in the matrix, providing open spaces for the flexing or bending of the individual fibers. Even after latex saturation, this flexibility is maintained.

As stated earlier, the present invention provides a saturated hydroentangled fibrous web which includes fibers and a saturant. The fibers include from about 20 to 100 percent by weight, based on the total weight of the fibers, of cellulosic fibers. From 0 to about 70 percent by weight of the fibers may be mercerized cellulosic fibers. For example, from about 75 to 100 percent by weight of the fibers may be cellulosic fibers. As another example, from about 20 to about 60 percent of the fibers may be mercerized cellulosic fibers. From about 80 to 0 percent by weight of the fibers, based on the total weight of the fibers, may be synthetic polymer fibers. For example, from about 10 to about 50 percent by weight of the fibers may be synthetic fibers. In certain embodiments, from about 10 to about 50 percent by weight of the fibers may be mercerized cellulosic fibers. In other embodiments, from about 10 to about 40 percent by weight of the fibers may be synthetic polymer fibers. In still other embodiments, both mercerized cellulosic fibers and synthetic polymer fibers may be present. By way of illustration only, the synthetic polymer fibers may be polyester or polyamide fibers.

Sources of cellulosic fibers include, by way of illustration only, woods, such as softwoods and hardwoods; straws and grasses, such as rice, esparto, wheat, rye, and sabai; canes and reeds, such as bagasse; bamboos; woody stalks, such as jute, flax, kenaf, and cannabis; bast, such as linen and ramie; leaves, such as abaca and sisal; and seeds, such as cotton and cotton linters. Softwoods and hardwoods are the more commonly used sources of cellulosic fibers; the fibers may be obtained by any of the commonly used pulping processes, such as mechanical, chemimechanical, semichemical, and chemical processes. Examples of softwoods include, by way of illustration only, longleaf pine, shortleaf pine, loblolly pine, slash pine, Southern pine, black spruce, white spruce, jack pine, balsam fir, douglas fir, western hemlock, redwood, and red cedar. Examples of hardwoods include, again by way of illustration only, aspen, birch, beech, oak, maple and gum.

Mercerization, of course, is a procedure which is well known to those having ordinary skill in the art. An example of mercerized cellulosic fibers is that used in the examples, a bleached mercerized southern pine kraft pulp, designated HPZ, produced by Buckeye Cellulose Corporation.

In general, the hydroentangled fibrous web may have a basis weight of from about 30 gsm to about 135 gsm. For example, the basis weight of the fibrous web may be in a range of from about 60 gsm to about 100 gsm.

The fibrous web may be hydroentangled by any known means before the web is saturated. Hydraulic entangling may be carried out with any appropriate high pressure working fluid, such as, by way of example only, water. The working fluid flows through a manifold which evenly distributes the fluid to a series of individual holes or orifices. These holes or orifices may be, by way of illustration, from about 0.003 to about 0.015 inch (from about 0.07 to about 1.6 mm) in diameter. For example, hydroentangling may utilize a manifold produced by Honeycomb Systems incorporated of Biddeford, Maine, containing a strip having 0.007-inch (about 0.18-mm) diameter orifices, 30 orifices per inch (about 12 orifices per cm), and one row of orifices. Many other manifold configurations and combinations may be used, however. For example, a single manifold may be used or several manifolds may be arranged in succession. As another example, the fibrous web may have a number of hydroentangled loci in a range of from about 62 to about 560 per square cm. As a further example, the fibrous web may have a number of hydroentangled loci in a range of from about 142 to about 390 per square cm.

In the hydraulic entangling process, the high pressure working fluid passes through the orifices at a pressure ranging from about 200 to about 2,000 pounds per square inch gage (psig) (from about 14 to about 140 kilograms per square centimeter, or $kg/cm^2$). The fluid impacts the web or substrate which is supported by a foraminous surface which may be, for example, a single plane mesh having a mesh count of from about 1,600 to about 10,000 per square inch (about 248–1,550 per square cm). The foraminous surface also may be a multiple plane mesh having a mesh count of from about 2,500 to about 40,000 per square inch (about 388–6,200 per square cm). As used herein, the term "mesh count" refers to a number which is the product of the number of wires in a wire mesh screen in both the machine (MD) and cross-machine (CD) directions in a given unit area. For example, a wire mesh screen having 100 wires per inch (about 15.5 wires per cm) in the machine direction and 100 wires per inch in the cross machine direction would have a mesh count of 10,000 per square inch (about 1,550 per square cm). Vacuum slots or other openings may be located directly beneath the hydroentangling manifold or beneath the foraminous surface downstream of the hydroentangling manifold so that excess fluid is withdrawn from the hydraulically entangled web or substrate.

The saturant is present in the saturated hydroentangled fibrous web at a level of from about 10 to about 100 percent by weight, based on the dry weight of the fibers. For example, the level of saturant in the saturated hydroentangled fibrous web may be in a range of from about 50 to about 100 percent by weight. As another example, the level of saturant in the saturated hydroentangled fibrous web may be in a range of from about 50 to about 80 percent by weight. When synthetic polymer fibers are present in the web, the saturant may be adapted to wet synthetic polymer fibers.

The saturant is adapted to render the saturated hydroentangled fibrous web durable and ink jet printable. For example, the saturant may be present in the saturated hydroentangled fibrous web at a level of from about 20 to about 70 percent. As another example, the saturant may be present at a level of from about 30 to about 60 percent. If desired, the saturant also may contain a filler at a level up to about 20 percent, on a dry weight basis. An example of a particularly useful filler is titanium dioxide.

The saturant includes from about 98 to about 70 percent, on a dry weight basis, of a latex reinforcing polymer having a glass transition temperature of from about −40° C. to about 25° C.; and from about 5 to about 70 percent, on a dry weight basis, of a cationic polymer. Either or both of the latex reinforcing polymer and the cationic polymer should have crosslinkable functional groups. For example, the crosslinkable functional groups may be present in the cationic polymer. Crosslinking may be assisted by the addition of one or more crosslinking agents to the saturant. By way of example, the saturant may include from about 4 to about 80 percent of a latex reinforcing binder. Further by way of example, the latex reinforcing polymer may have glass transition temperature of from about −20° C. to about 15° C. Also by way of example, substantially all of the fibers of which the fibrous web is composed may be cellulosic fibers. While the latex reinforcing polymer may be either nonionic or cationic, nonionic latex reinforcing polymers are desired. For example, the latex reinforcing polymer may be an ethylene-vinyl acetate copolymer or a nonionic polyacrylate. Examples of cationic latex reinforcing polymers include, by way of illustration only, polyamides, amide-epichlorohydrin resins, polyethyleneimines, polyacrylamides, and urea-formaldehyde resins. As a further example, the cationic polymer may be present in the saturant at a level of from about 10 to about 60 percent. As still another example, the cationic polymer may be present in the saturant at a level of from about 15 to about 50 percent.

The present invention further provides a hydroentangled fibrous substrate which includes a first layer composed of fibers and having first and second surfaces and a second layer which is a bonded nonwoven web having first and second surfaces. The second surface of the first layer overlays the first surface of the second layer. From about 20 to 100 percent by weight of the fibers of the first layer, based on the total weight of the of the fibers, are cellulosic fibers and from 0 to about 70 percent by weight of the fibers of the first layer, again based on the total weight of the fibers, may be mercerized cellulosic fibers. For example, from about 75 to about 100 percent by weight of the fibers may be cellulosic fibers. As another example, from about 20 to about 60 of the fibers may be mercerized cellulosic fibers. From about 80 to 0 percent by weight of the fibers of the first layer, based on the total weight of the fibers, may be synthetic polymer fibers. For example, in certain embodiments, from about 10 to about 50 percent by weight of the fibers in the first layer may be mercerized cellulosic fibers. In other embodiments, from about 10 to about 40 percent by weight of the fibers in the first layer may be synthetic polymer fibers. In still other embodiments, both mercerized cellulose fibers and synthetic polymer fibers may be present. By way of illustration only, the synthetic polymer fibers may be polyester or polyamide fibers.

The first layer of the hydroentangled fibrous substrate typically may have a basis weight of from about 20 gsm to about 100 gsm. For example, the basis weight of the first layer may be in a range of from about 30 gsm to about 90 gsm.

A saturant is present in at least the first layer of the substrate at a level of from about 10 to about 100 percent, based on the dry weight of the fibers of the layer or layers in which the saturant is present. Thus, the saturant may be present in only the first layer or in both the first layer and the second layer. When synthetic polymer fibers are present in either or both layers, the saturant may be adapted to wet synthetic polymer fibers. Desirably, the saturant will be present in both the first and second layers.

The second layer of the hydroentangled fibrous substrate typically may have a basis weight of from about 6 gsm to about 40 gsm. Such layer is a bonded nonwoven web as already defined. Desirably, the bonded nonwoven web will be a spunbonded web. As is well known by those having ordinary skill in the art, the term "spunbonding" refers to the production of small diameter continuous filaments which are formed by extruding a molten thermoplastic polymer as filaments from a plurality of fine, usually circular, capillaries of a spinnerette, with the diameter of the extruded filaments then being rapidly reduced by, for example, eductive drawing.

Numerous spunbonded webs prepared from various thermoplastic polymers are commercially available. The most extensively utilized commercial materials are made from filaments of polyamides, polyesters, and polyolefins such as polyethylene and polypropylene, although other polymers, such as rayon, cellulose acetate, acrylics also may be employed.

The fibrous substrate may be hydroentangled by any known means, as described earlier, before the substrate is saturated. Hydroentangling results in a plurality of entanglement loci in the web. For example, the number of entanglement loci may be in a range of from about 62 to about 560 per square cm. As another example, the number of entanglement loci may be in a range of from about 142 to about 390 per square cm.

The hydroentangling process variables generally are determined, at least in part, by the basis weight and density of the web or substrate being hydroentangled. Increased water jet pressure typically results in higher internal strength of the web as measured by delamination tests. Water jet pressure also contributes to a lowering of the stiffness of the saturated hydroentangled fibrous web. Similar enhancements of increased internal bond strength and reduced stiffness also may be achieved by maintaining the water pressure constant but subjecting the web to multiple passes under the hydroentangling jets. This may be done by using multiple banks or rows of jet manifolds. Finally, hydroentangling desirably is carried out with the first layer facing the hydroentangling jets. Depending upon such factors as jet pressure, the thickness of the first and second layers, and second layer fiber diameters, among others, it may be appropriate to conduct hydroentangling with the second layer facing the jets or to hydroentangle both sides, either simultaneously or sequentially.

Typically, a hydroentangled substrate is significantly more absorbent than an otherwise identical substrate which has not been hydroentangled. In addition, the saturated hydroentangled substrate remains absorbent, even with relatively high levels of saturant. In contrast, conventional latex saturated cellulosic webs lose absorbent properties in proportion to the amount of saturant present in the web. Not only is the saturated hydroentangled substrate of the present invention still absorbent, but it also provides an excellent surface for absorbing printing inks or specialized coatings.

Latex saturation of the hydroentangled web or substrate may be carried out by any means known to those having ordinary skill in the art. Typically, the web or substrate is exposed to an excess of the impregnating dispersion or latex, run through a nip, and dried. One particular process passes the web through squeeze rolls which apply latex from a saturation latex basin and then provide the web to a number of drying cans held at temperatures of about 90° C. to about 150° C. The latex saturated web then is wound by a roll windup device and is ready for commercial use. However, the impregnating dispersion may be applied by other methods, such as brushing, doctor blading, spraying, and direct and offset gravure printing or coating and the present invention is not limited to any particular impregnating process. The hydroentangled web or substrate can be easily handled on ordinary equipment because of the inherent strength of the web. Drying of the substrate is rapid due to the open characteristic of the hydroentangled surface with minute holes or openings. This allows rapid evaporation of the water from the saturant. This open characteristic of the substrate also allows ink absorption to occur during printing.

Depending upon the basis weights of the first and second layers and the hydroentangling conditions, both sides of the hydroentangled fibrous substrate may be essentially same or different. In the former case, saturation of the substrate is most likely to involve both layers, whether or not the saturant wets the second layer fibers.

In the latter case, however, the first layer and second layers, though hydroentangled together to a significant degree, may retain their original characteristics. That is, the substrate may have, in effect, two different sides. If the saturant does not wet the second layer fibers, saturation generally will be limited to the first layer, regardless of the method used to apply saturant to the substrate. Whether or not the saturant wets the second layer fibers, the method of applying the saturant may reduce or minimize the presence of saturant in the second layer. For example, brushing or spraying the saturant only on the first layer side of the substrate may limit penetration of the saturant into the second layer.

The latex saturant is composed of natural, synthetic or a combination of natural and synthetic polymers. In addition to latex, other soluble polymers and additives may be incorporated into the saturant for special end use properties. Such additives may include pigments, fillers, clay, titanium dioxide, crosslinking agents and rheology modifiers. For example, both crosslinking agents and rheology modifiers have been utilized with good results. The hydroentangled web is impregnated with latex by directing the web through a bath of saturant containing the latex. The web is then squeezed between rolling press rolls to remove excess saturant. The amount of latex added to the hydroentangled web should be in the range of 10 to 100 dry grams of saturant to 100 dry grams of fiber. Next the web is dried at a temperature of 107° C. on heated rotating drums. The web is then wound while hot into a roll to cure and develop the necessary wet strength properties of the web. In some cases this cure for wet strength can take place at room temperature when specific polymers and curing aids are used.

The present invention is further described by the examples which follow. Such examples, however, are not to be construed as limiting in any way either the spirit or the scope of the present invention.

Each example employed a substrate prepared as follows. A wet cellulosic web composed of 75 percent by weight of northern softwood Kraft pulp and 25 percent by weight of southern softwood Kraft pulp and having a dry basis weight of 50 gsm was overlayed on an approximately 14-gsm nonwoven web of spunbond polypropylene. The resulting substrate was hydroentangled from the cellulosic web side at 454 feet per minute (about 140 meters per minute) through the water jets of a hydroentangling unit having five manifolds and a water jet pressure of 1,100 psi. The hydroentangled substrate was dried and saturated to an add-on level expressed as dry grams of saturant per 100 dry grams of fiber.

A number of different latex saturant compositions or formulations were employed in the examples. These are summarized in Tables 1–12, below.

TABLE 1

Latex Saturant A

| Ingredient | % Solids | Parts Dry | Parts Wet |
|---|---|---|---|
| Self-crosslinking ethylene-vinyl acetate copolymer latex saturant or binder (Airflex ® 124, Air Products and Chemicals, Inc., Allentown, PA) | 50 | 50 | 100 |
| Water | — | — | 104 |
| Cationic amine polymer-epichlorohydrin adduct (Reten ® 204 LS, Hercules Incorporated, Wilmington, DE) | 13.6 | 13.5 | 99 |
| Ammonia | 28 | 0.5 | 1.8 |
| Final saturant composition | 21 | 64 | 305 |

TABLE 2

Latex Saturant B

| Ingredient | % Solids | Parts Dry | Parts Wet |
|---|---|---|---|
| Self-crosslinking ethylene-vinyl acetate copolymer latex saturant or binder (Airflex ® 124, Air Products and Chemicals, Inc., Allentown, PA) | 50 | 50 | 100 |
| Water | — | — | 104 |
| Cationic amine polymer-epichlorohydrin adduct (Reten ® 204 LS, Hercules Incorporated, Wilmington, DE) | 13.6 | 13.5 | 99 |
| Ammonia | 28 | 0.5 | 1.8 |
| Polyfunctional aziridine crosslinking agent, pentaeryhtritol-tris-(B-(aziridinyl)propionate) (Xama ® 7, EIT, Inc., Lake Wylie, SC) | 100 | 1.5 | 1.5 |
| Final saturant composition | 21 | 65.5 | 307 |

TABLE 3

Latex Saturant C

| Ingredient | % Solids | Parts Dry | Parts Wet |
|---|---|---|---|
| Self-crosslinking ethylene-vinyl acetate copolymer latex saturant or binder (Airflex ® 124, Air Products and Chemicals, Inc., Allentown, PA) | 50 | 50 | 100 |

TABLE 3-continued

Latex Saturant C

| Ingredient | % Solids | Parts Dry | Parts Wet |
|---|---|---|---|
| Quaternary amine acrylate copolymer (Alcostat ® 567, Allied Colloids, Suffolk, VA) | 28.8 | 13.5 | 47 |
| Ammonia | 28 | 0.5 | 1.8 |
| Polyfunctional aziridine crosslinking agent, pentaeryhtritol-tris-(B-(aziridinyl)propionate) (Xama ® 7, EIT, Inc., Lake Wylie, SC) | 100 | 1.5 | 1.5 |
| Final saturant composition | 43.6 | 65.5 | 150 |

TABLE 4

Latex Saturant D

| Ingredient | % Solids | Parts Dry | Parts Wet |
|---|---|---|---|
| Poly(vinyl acetate) latex saturant or binder (Airflex ® 140, Air Products and Chemicals, Inc., Allentown, PA) | 50 | 50 | 100 |
| Quaternary amine acrylate copolymer (Alcostat ® 567, Allied Colloids, Suffolk, VA) | 28.8 | 13.5 | 47 |
| Ammonia | 28 | 0.5 | 1.8 |
| Polyfunctional aziridine crosslinking agent, pentaeryhtritol-tris-(B-(aziridinyl)propionate) (Xama ® 7, EIT, Inc., Lake Wylie, SC) | 100 | 1.5 | 1.5 |
| Final saturant composition | 43.6 | 65.5 | 150 |

TABLE 5

Latex Saturant E

| Ingredient | % Solids | Parts Dry | Parts Wet |
|---|---|---|---|
| Self-crosslinking ethylene-vinyl acetate copolymer latex saturant or binder (Airflex ® 124, Air Products and Chemicals, Inc., Allentown, PA) | 50 | 50 | 100 |
| Water | | | 68 |
| Organic cationic polyelectrolyte (Alcostat ® 167, Allied Colloids, Suffolk, VA) | 13.6 | 27 | 199 |
| Ammonia | 28 | 0.5 | 1.8 |
| Final saturant composition | 21 | 77.5 | 369 |

TABLE 6

Latex Saturant F

| Ingredient | % Solids | Parts Dry | Parts Wet |
|---|---|---|---|
| Self-crosslinking ethylene-vinyl acetate copolymer latex saturant or binder (Airflex ® 124, Air Products and Chemicals, Inc., Allentown, PA) | 50 | 50 | 100 |
| Water | | | 68 |
| Polymerized quaternary ammonium salt in aqueous solution (Calgon ® 261 LV, Calgon Corporation, Pittsburgh, PA) | 25 | 13.5 | 54 |
| Ammonia | 28 | 0.5 | 1.8 |

TABLE 6-continued

Latex Saturant F

| Ingredient | % Solids | Parts Dry | Parts Wet |
|---|---|---|---|
| Polyfunctional aziridine crosslinking agent, pentaeryhtritol-tris-(B-(aziridinyl)propionate) (Xama ® 7, EIT, Inc., Lake Wylie, SC) | 100 | 1.5 | 1.5 |
| Final saturant composition | 21 | 65.5 | 218 |

TABLE 7

Latex Saturant G

| Ingredient | % Solids | Parts Dry | Parts Wet |
|---|---|---|---|
| Poly(vinyl acetate) latex saturant or binder (Airflex ® 240, Air Products and Chemicals, Inc., Allentown, PA) | 50 | 50 | 100 |
| Water | | | 104 |
| Cationic amine polymer-epichlorohydrin adduct (Reten ® 204 LS, Hercules Incorporated, Wilmington, DE) | 13.6 | 13.5 | 99 |
| Ammonia | 28 | 0.5 | 1.8 |
| Polyfunctional azirdine crosslinking agent, pentaeryhtritol-tris-(B-(aziridinyl)propionate) (Xama ® 7, EIT, Inc., Lake Wylie, SC) | 100 | 1.5 | 1.5 |
| Final saturant composition | 21 | 65.5 | 308 |

TABLE 8

Latex Saturant H

| Ingredient | % Solids | Parts Dry | Parts Wet |
|---|---|---|---|
| Self-crosslinking ethylene-vinyl acetate copolymer latex saturant or binder (Airflex ® 124, Air Products and Chemicals, Inc., Allentown, PA) | 50 | 50 | 100 |
| Water | | | 74 |
| Organic cationic polyelectrolyte (Alcostat ® 167, Allied Colloids, Suffolk, VA) | 13.6 | 27 | 199 |
| Ammonia | 28 | 0.5 | 1.8 |
| Polyfunctional aziridine crosslinking agent, pentaeryhtritol-tris-(B-(aziridinyl)propionate) (Xama ® 7, EIT, Inc., Lake Wylie, SC) | 100 | 1.5 | 1.5 |
| Final saturant composition | 21 | 79 | 376 |

TABLE 9

Latex Saturant I

| Ingredient | % Solids | Parts Dry | Parts Wet |
|---|---|---|---|
| Ethylene-vinyl acetate copolymer latex saturant or binder (Airflex ® 124, Air Products and Chemicals, Inc., Allentown, PA) | 50 | 50 | 100 |
| Water | | | 165 |

TABLE 9-continued

Latex Saturant I

| Ingredient | % Solids | Parts Dry | Parts Wet |
|---|---|---|---|
| Polymerized quaternary ammonium salt in aqueous solution (Calgon ® 261 LV, Calgon Corporation, Pittsburgh, PA) | 25 | 27 | 108 |
| Ammonia | 28 | 0.5 | 1.8 |
| Polyfunctional aziridine crosslinking agent, pentaeryhtritol-tris-(B-(aziridinyl)propionate) (Xama ® 7, EIT, Inc., Lake Wylie, SC) | 100 | 1.5 | 1.5 |
| Final saturant composition | 21 | 79 | 376 |

TABLE 10

Latex Saturant J

| Ingredient | % Solids | Parts Dry | Parts Wet |
|---|---|---|---|
| Self-crosslinking ethylene-vinyl acetate copolymer latex saturant or binder (Airflex ® 124, Air Products and Chemicals, Inc., Allentown, PA) | 50 | 50 | 100 |
| Water | | | 95 |
| Cationic amine polymer-epichlorohydrin adduct (Kymene ® 557 LX, Hercules Incorporated, Wilmington, DE) | 12.5 | 13.5 | 108 |
| Ammonia | 28 | 0.5 | 1.8 |
| Final saturant composition | 21 | 64 | 305 |

TABLE 11

Latex Saturant K

| Ingredient | % Solids | Parts Dry | Parts Wet |
|---|---|---|---|
| Self-crosslinking ethylene-vinyl acetate copolymer latex saturant or binder (Airflex ® 124, Air Products and Chemicals, Inc., Allentown, PA) | 50 | 50 | 100 |
| Water | | | 74 |
| Organic cationic polyelectrolyte (Alcostat ® 167, Allied Colloids, Suffolk, VA) | 13.6 | 27 | 199 |
| Ammonia | 28 | 0.5 | 1.8 |
| Final saturant composition | 21 | 77 | 375 |

TABLE 12

Latex Saturant L

| Ingredient | % Solids | Parts Dry | Parts Wet |
|---|---|---|---|
| Self-crosslinking ethylene-vinyl acetate copolymer latex saturant or binder (Airflex ® 124, Air Products and Chemicals, Inc., Allentown, PA) | 50 | 50 | 100 |
| Water | | | 88 |
| Cationic amine polymer-epichlorohydrin adduct (Reten ® 204 LS, Hercules Incorporated, Wilmington, DE) | 13.6 | 13.5 | 99 |
| Ammonia | 28 | 0.5 | 1.8 |
| Water | | | 50 |

TABLE 12-continued

Latex Saturant L

| Ingredient | % Solids | Parts Dry | Parts Wet |
|---|---|---|---|
| Titanium dioxide pigment (Ti-Pure RPS Vantage, Dupont, Wilmington, DE) | 72 | 10 | 14 |
| Final saturant composition | 21 | 74 | 352 |

To saturate a sample of the substate, a portion of the substrate was treated using a laboratory saturator, similar to an Atlas Laboratory Wringer, and drying on steam-heated cans. The percent add-on was either 50 or 70 parts per 100 parts of fiber. The saturated substrates thus prepared are summarized in Table 13. In the table, "Parts Pickup" represents dry parts by weight of saturant per 100 parts by weight of dry substrate.

TABLE 13

Summary of Saturated Substrates

| Example | Saturant Formulation | Parts Pickup |
|---|---|---|
| 1 | A | 70 |
| 2 | B | 70 |
| 3 | C | 70 |
| 4 | D | 70 |
| 5[a] | E | 70 |
| 6 | F | 70 |
| 7 | A | 50 |
| 8[a] | G | 50 |
| 9[a] | H | 50 |
| 10[a] | I | 50 |
| 11[a] | J | 50 |
| 12 | K | 50 |
| 13 | L | 79 |

[a]The saturated substrate was heated at 107° C. for one hour in an effort to improve saturant crosslinking.

Each saturated substrate was printed with the standard test pattern using a standard desktop Canon BJC-600 color ink jet printer. The test pattern included areas of solid color, colored pattern, and black and white print. The printed substrate was trimmed to 2 inches by 4.5 inches (about 5 cm by about 11.4 cm) and sewn with a conventional home sewing machine onto a bath towel. The towel then was machine washed and dried in a home washing machine and dryer.

After washing, all substrates were evaluated for substrate integrity, e.g., the absences of holes and minimal or no fraying at the edges. Print color intensity was evaluated for fading and washing out of color. Legibility of the printed area also was evaluated. The evaluation results are summarized in Table 14 (after 25 wash cycles) and Table 15 (after 50 wash cycles).

TABLE 14

Evaluation Summary after 25 Wash Cycles

| Example | Substrate Integrity | Color Intensity | Legibility |
|---|---|---|---|
| 1 | Excellent | Excellent | Excellent |
| 2 | Excellent | Excellent | Excellent |
| 3 | Failed | Failed | Failed |
| 4 | Failed | Failed | Failed |

TABLE 14-continued

Evaluation Summary after 25 Wash Cycles

| Example | Substrate Integrity | Color Intensity | Legibility |
|---|---|---|---|
| 5 | Excellent | Poor | Poor |
| 6 | Poor | Poor | Failed |
| 8 | Excellent | Excellent | Excellent |
| 9 | Fair | Poor | Poor |
| 10 | Failed | Poor | Poor |
| 11 | Excellent | Excellent | Excellent |
| 12 | Fair | Poor | Poor |
| 13 | Excellent | Excellent | Excellent |

TABLE 15

Evaluation Summary after 50 Wash Cycles

| Example | Substrate Integrity | Color Intensity | Legibility |
|---|---|---|---|
| 1 | Excellent | Excellent | Excellent |
| 2 | Excellent | Excellent | Excellent |
| 6 | Fair | Poor | Poor |
| 7 | Excellent | Excellent | Excellent |
| 8 | Failed | Poor | Poor |
| 11 | Excellent | Excellent | Excellent |
| 12 | Failed | Poor | Poor |

The data in Tables 14 and 15 demonstrate the need for functional groups in either or both the latex reinforcing polymer and the cationic polymer which permit crosslinking. Note especially the data for Examples 1, 2, and 6 in Table 15.

While the specification has been described in detail with respect to specific embodiments thereof, it will be appreciated by those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A saturated hydroentangled fibrous web comprising:
a fibrous web having a plurality of entanglement loci as a consequence of subjecting the fibrous web to high pressure liquid jets, the fibrous web being comprised of fibers, in which
about 20 to 100 percent by weight, based on the total weight of the fibers, are cellulosic fibers;
0 to about 70 percent by weight, based on the total weight of the fibers, are mercerized cellulosic fibers; and
about 80 to 0 percent by weight of the fibers, based on the total weight of the fibers, are synthetic polymer fibers; and
a saturant which is present in the hydroentangled fibrous web at a level of about 10 to about 100 percent, based on the dry weight of the fibers, and adapted to render the saturated paper durable and ink jet printable, the saturant comprising
about 98 to about 70 percent, on a dry weight basis, of a latex reinforcing polymer having a glass transition temperature of about −40° C. to about 25° C.; and
about 5 to about 70 percent, on a dry weight basis, of a cationic polymer; wherein either or both of the latex reinforcing polymer and the cationic polymer have crosslinkable functional groups.

2. The saturated hydroentangled fibrous web of claim 1, in which the saturant is present in the hydroentangled fibrous web at a level of about 20 to about 70 percent.

3. The saturated hydroentangled fibrous web of claim 1, in which the saturant is present in the hydroentangled fibrous web at a level of about 30 to about 60 percent.

4. The saturated hydroentangled fibrous web of claim 1, in which the latex reinforcing polymer has a glass transition temperature of about −20° C. to about 15° C.

5. The saturated hydroentangled fibrous web of claim 1, in which the cationic polymer is present in the saturant at a level of about 10 to about 60 percent.

6. The saturated hydroentangled fibrous web of claim 1, in which the cationic polymer is present in the saturant at a level of about 15 to about 50 percent.

7. The saturated hydroentangled fibrous web of claim 1, in which the saturant further comprises a filler at a level up to about 20 percent, on a dry weight basis.

8. The saturated hydroentangled fibrous web of claim 7, in which the filler is titanium dioxide.

9. The saturated hydroentangled fibrous web of claim 1, in which substantially all of the fibers are cellulosic fibers.

10. The saturated hydroentangled fibrous web of claim 1, in which
the saturant is present in the hydroentangled fibrous web at a level of about 20 to about 70 percent, based on the dry weight of the fibers;
the amount of the latex reinforcing polymer in the saturant is about 96 to about 80 percent, on a dry weight basis;
the glass transition temperature of the latex reinforcing polymer is about −20° C. to about 15° C.; and
the amount of cationic polymer in the saturant is about 4 to about 20 percent, on a dry weight basis.

11. The saturated hydroentangled fibrous web of claim 10, in which the saturant is present at a level of about 30 to about 70 percent.

12. The saturated hydroentangled fibrous web of claim 10, in which substantially all of the fibers comprising the fibrous web are cellulosic fibers.

13. The saturated hydroentangled fibrous web of claim 10, in which the fibrous web has a basis weight of about 30 to about 135 grams per square meter.

14. The saturated hydroentangled fibrous web of claim 10, in which the fibrous web has a number of entanglement loci in a range of about 62 to about 560 per square cm.

15. The saturated hydroentangled fibrous web of claim 10, in which the fibrous web has a number of entanglement loci in a range of about 142 to about 390 per square cm.

* * * * *